March 11, 1924.

G. H. DYER

HOSE COUPLING

Filed March 29, 1920

1,486,421

INVENTOR
GEORGE H. DYER

BY Chas E Townsend

ATTORNEY

Patented Mar. 11, 1924.

1,486,421

UNITED STATES PATENT OFFICE.

GEORGE H. DYER, OF SAN FRANCISCO, CALIFORNIA.

HOSE COUPLING.

Application filed March 29, 1920. Serial No. 369,578.

*To all whom it may concern:*

Be it known that I, GEORGE H. DYER, a citizen of the United States, residing at city and county of San Francisco, and State of California, have invented a new and useful Improvement in Hose Couplings, of which the following is a specification.

This invention relates to a hose coupling.

It is the principal object of the present invention to provide a hose coupling of simple construction which may be readily applied to a hose and which will clamp the hose in a manner to prevent leakage even though excessive high fluid pressures are established therethrough.

The invention contemplates the use of a resilient clamping member, a tubular core around which the hose is clamped by said member and a threaded frusto-conical sleeve actuating said clamping member.

The invention is illustrated by way of example in the accompanying drawings, in which.

Figure 1:
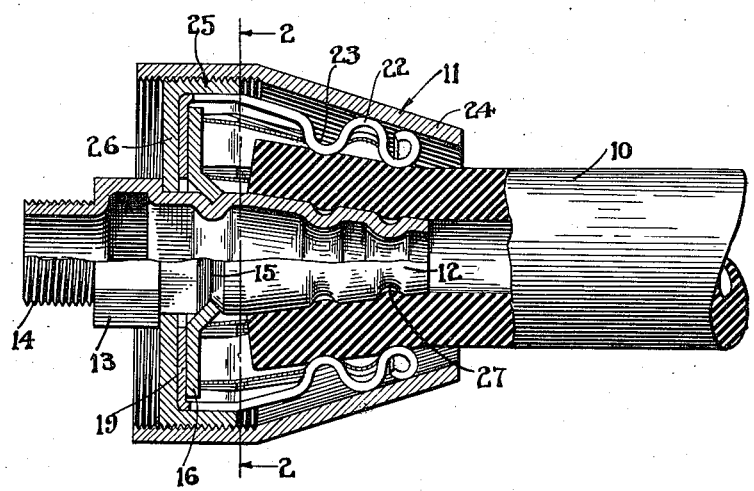
Fig. 1 is a view in central vertical section through a section of hose and the coupling with which the present invention is concerned.
Figure 2:
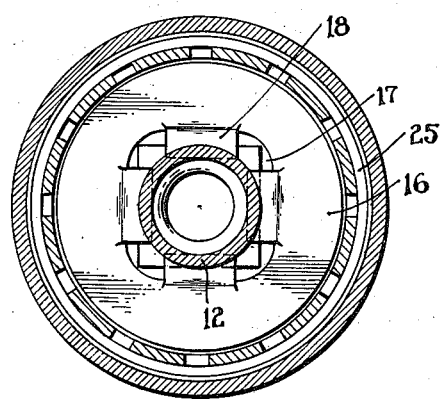
Fig. 2 is a view in transverse section through the coupling as seen on the line 2—2 of Fig. 1.

In the drawings, 10 indicates a length of hose. This hose may be of any desired construction and may be designed for the purpose of conveying liquids or high pressure fluids, such as compressed air. Mounted over the end of the hose is a coupling 11 with which the present invention is concerned. This coupling comprises a central, tubular core 12 formed with circumferentially extending corrugations and being further constructed so that it gradually tapers toward its opened end. This core is formed integral with a hollow nut portion 13 which is in turn formed integral with a tubular sleeve 14 by which the core may be detachably secured to a desired connection. A V-shaped circumferentially extending corrugation 15 is formed around the enlarged body of the core at a point near the nut 13. As seen in Fig. 2 the bottom walls of this corrugation define a square and thus provide four V-shaped grooves combining to extent around the complete circumference of the core. This channel receives an assembly washer 16, the washer having a main disk portion and a central opening 17 therethrough. Angular tangs 18 project from the margin of the opening 17 and register with the various V-shaped grooves as generally indicated at 15.

Figure 3:
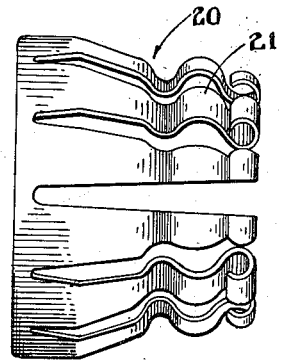
Fig. 3 is a view of the clamping element as disassociated from the remaining parts of the device.

It will be noted that due to the arrangement of the flared tangs of the washer, the ends of these portions are directly abutted against one of the straight faces of the V-shaped corrugations and will thus be held against longitudinal or circumferential movement. The disk portion of the washer 16 rests against an annular flange 19 of the clamping element 20. This element is more clearly shown in Fig. 3 of the drawings where it will be seen to be formed of thin metal and to possess a plurality of corrugated clamping fingers 21. The ends of these fingers are rolled to facilitate in the operation of inserting the hose wall between the fingers and over the tapered core. This roll portion also provides a bearing surface in combination with corrugations 22 and 23 whereby a frusto-conical clamping sleeve 24 may force the fingers downwardly and bind the wall of the hose onto the core. The base portion of the sleeve 24 is internally threaded to receive the cylindrical part 25 of an abutment disk 26. This disk has a central opening through which the core extends and furthermore bears directly against the shoulder provided by the enlarged nut section 13. Due to the fact that the disk 26 is immovable the washer 16 will securely clamp the portion 19 of the clamping element 20 in rigid position with the grooves 15 of the core. Attention is directed to the fact that in the present instance the large circumference of the clamping element at its base is considerably greater in diameter than that of a hose which might be mounted over a core of the dimension employed. In this manner the three fullnesses of the device will not be limited. With this idea in view the frusto-conical sleeve 24 is also formed with an enlarged opening through which the hose extends. It is therefore possible to adapt the present invention to oversize hose when desired.

In the operation of the present device, the frusto-conical sleeve 24 is preferably removed and the hose passed therethrough. The end of the hose is then mounted on the coupling with the tapered core inserted within the passageway through the hose. This will necessitate that the spring fingers 21 of the clamping element 20 shall be expanded to accommodate the hose wall, after which the enlarged portion of the sleeve 24 is screwed onto the portion 25 of the fixed disk 26 and as tightened will cause the annular tapered face of the sleeve to encounter the roller ends of the fingers and the corrugations 22 of each of the fingers. This action will force the fingers onto the hose and in fact will distort the walls of the hose in a manner to press portions of the wall into the circumferential corrugations 27 formed around the core. It is to be noted that the undulations in the fingers and the corrugations around the tapered portion of the core substantially agree, so that inward pressure upon the outer circumference of the hose wall will produce an outward pressure upon the inner circumference at the points of the corrugations and thus more securely bind the hose in position. It will thus be seen that the hose connection here disclosed is simple and inexpensive in construction, being formed of few parts not liable to become broken and capable of actuation in a manner to positively grip a hose and hold it to prevent displacement or leakage.

While I have shown the preferred form of my invention, it will be understood that various changes in the construction, combination and arrangement of parts may be made by those skilled in the art, without departing from the spirit of the invention as disclosed.

Having thus described my invention, what I claim and desire to secure by Letters Patent, is:

1. A hose coupling comprising a core member having a tapered portion adapted to be inserted within a hose, an externally threaded disc member adapted to be secured on the core member, a clamp member adapted to embrace the end of the hose and comprising a plurality of circumferentially corrugated yieldable fingers, means for securing the disc member and the clamp member to the core member and a frusto-conical clamping sleeve adapted to be screwed onto the disc and to draw against the yieldable fingers in a manner to produce a clamping action between the fingers and the tapered portion of the core against the wall of a hose interposed between the core member and the yieldable fingers.

2. A hose coupling comprising a central tubular member adapted to be inserted in the end of a hose, said member having a plurality of circumferentially extending recesses formed in the outer surface thereof, a contractible clamping member adapted to embrace the end of the hose, said clamping member being circumferentially corrugated, the internal corrugations on said clamping member being disposed in radial alignment with said circumferential recesses in the tubular member when the device is assembled, and means for contracting said clamping member.

3. A hose coupling comprising a tapered central tubular member, its largest diameter being greater than the internal diameter of the hose to be coupled, said outer circumference being formed with a plurality of circumferentially extending corrugations, a clamping element carrying a plurality of undulated yieldable fingers adapted to circumscribe the hose, a tapered sleeve to be positioned over the fingers and a fixed washer onto which the sleeve may be screwed and which will produce a clamping action between the fingers of the clamping element and the central tubular member.

4. A hose coupling comprising a tubular core threaded at one end and formed with an externally tapered portion at its opposite end, circumferential corrugations formed around said tapered portion, a shoulder formed on the core, a threaded disk adapted to rest thereagainst, a clamping element formed with a plurality of yieldable fingers and arranged in circumscribing relation to the tapered portion of the core, said fingers having corrugations substantially agreeing in location with the corrugations of the core, means for fixing the base of said clamping element relative to the threaded disk and a frusto-conical clamping sleeve adapted to be screwed onto the disk and to draw against the yieldable fingers in a manner to produce a clamping action between said fingers and the tapered portion of the core and against the wall of a hose inserted over said core and embraced by said fingers.

5. A hose coupling comprising a core member having a tapered hose entering extension formed at one end, said tapered portion having annular grooves formed therein, an enlarged portion formed at the opposite end of the core member thereby providing a shoulder between the tapered and the enlarged portions, an externally threaded disc mounted on the core and abutting against the shoulder, a clamping member comprising a body portion and a plurality of circumferentially corrugated fingers extending therefrom, a V-shaped groove in the core member, a washer having angularly extending tangs extending within said groove and securing the body portion of the clamp member and the disc member against the shoulder on the core member, a frusto-conical sleeve member interiorly adapted at one end to engage the exterior of the disc and be screwed thereon and thereby engage the yieldable fingers for forcing the same inwardly and thereby clamp the wall of the hose interposed between the core member and the yieldable fingers.

In testimony whereof, I have hereunto set my hand in the presence of subscribing witness.

GEORGE H. DYER.

Witness:
J. W. HERRING.